United States Patent
Lin et al.

(10) Patent No.: US 9,810,045 B2
(45) Date of Patent: Nov. 7, 2017

(54) CONNECTION CONDITIONS FOR MODELING FLUID TRANSPORT IN A WELL SYSTEM ENVIRONMENT

(71) Applicant: HALLIBURTON ENERGY SERVICES, INC., Houston, TX (US)

(72) Inventors: Avi Lin, Houston, TX (US); Srinath Madasu, Houston, TX (US)

(73) Assignee: Halliburton Energy Services, Inc., Houston, TX (US)

( * ) Notice: Subject to any disclaimer, the term of this patent is extended or adjusted under 35 U.S.C. 154(b) by 925 days.

(21) Appl. No.: 14/011,349

(22) Filed: Aug. 27, 2013

(65) Prior Publication Data

US 2015/0066446 A1 Mar. 5, 2015

(51) Int. Cl.
*G06G 7/48* (2006.01)
*E21B 43/00* (2006.01)
*G06F 17/50* (2006.01)
*E21B 43/26* (2006.01)

(52) U.S. Cl.
CPC .............. *E21B 43/00* (2013.01); *E21B 43/26* (2013.01); *G06F 17/5018* (2013.01); *G06F 2217/16* (2013.01)

(58) Field of Classification Search
CPC ...... E21B 43/00; E21B 43/26; G06F 17/5018; G06F 2217/16
USPC ....................................... 703/9, 10
See application file for complete search history.

(56) References Cited

U.S. PATENT DOCUMENTS

| | | | |
|---|---|---|---|
| 2009/0216508 A1* | 8/2009 | Dale | E21B 43/00 703/10 |
| 2012/0136641 A1* | 5/2012 | Fung | E21B 43/00 703/10 |
| 2012/0179436 A1* | 7/2012 | Fung | E21B 49/00 703/2 |

OTHER PUBLICATIONS

Kittiphong Jongkittinarukorn, Robert Kerr, "Flow Model Selection for Production Logging Interpretation of Gas Wells" SPE 145579, Society of Petrolium Engineers, 2011, pp. 1-18.*
R.E. Fitzmorris, F.J. Kelsey, K.K. Pande, "Effect of Crossflow on Sweep Efficiency in Water/Oil Displacements in Heterogeneous Reservoirs" Society of Petrolium Engineers, SPE 24801, 1992, pp. 447-460.*
MFrac—3D Hydraulic Fracturing Simulator, Baker Hughes, copyright 1983-2013, accessed online Jul. 2013 at www.mfrac.com/mfrac.html, 2 pages.
"Meyer Fracturing Simulators," Meyer & Associates, Inc. User's Guide, Ninth Edition, copyright 2011, 1022 pages.
Mangrove Reservoir-Centric Stimulation Design Software, Schlumberger, copyright 2013, accessed online Jul. 2013 at http://www.slb.com/services/completions/stimulation/execution/mangrove.aspx, 1 page.
(Continued)

*Primary Examiner* — Dwin M Craig
(74) *Attorney, Agent, or Firm* — John Wustenberg; Parker Justiss, P.C.

(57) ABSTRACT

In some aspects, flow path connection conditions are generated for a flow path intersection in a one-dimensional fluid flow model. The one-dimensional fluid flow model represents a flow of well system fluid in a well system environment. The flow path connection conditions conserve fluid momentum among three or more flow path branches that meet at the flow path intersection. Fluid flow is simulated in the fracture network by operating the one-dimensional fluid flow model based on the connection condition.

26 Claims, 7 Drawing Sheets

(56) References Cited

OTHER PUBLICATIONS

Mangrove Reservoir-Centric Stimulation Design Software, Schlumberger, copyright 2013, accessed online Jul. 2013 at http://www.slb.com/~/media/Files/stimulation/product_sheets/design/mangrove_ps.pdf, 2 pages.
Fracpro Fracture Stimulation Software, Fracture Modeling, "Fracpro®: The Power to Optimize Performance", copyright 2011, accessed online Jul. 2013 at http://www.carboceramics.com/fracpro-software/, 1 page.
"Fracturing Treatment Optimization Through Integrated Monitoring and Analysis," Pinnacle Fracture Monitoring, Fiber Optic Distributed Temperature Sensing and Microseismic Mapping Technologies, Halliburton, Published in 2011, 3 pages.
"Fracpro® software—The Most Widely Used Fracture Modeling Software in the Petroleum Industry", StrataGen, Inc., Published in 2011, 2 pages.
"Welcome to the family," Knoesis Halliburton Production Enhancement, Oct. 2012, 8 pages.
Kesserwani, Georges, et al., "Simulation of subcritical flow at open-channel junction," Advances in Water Resources 31, Published in 2008, pp. 287-297, 11 pages.
Hsu, Chung-Chieh, et al., "Subcritical Open-Channel Junction Flow," Journal of Hydraulic Engineering, Aug. 1998, pp. 847-855, 9 pages.
Ghostine, Rabih, et al., "Two-Dimensional Simulation of Subcritical Flow at a Combining Junction: Luxury or Necessity?" Journal of Hydraulic Engineering, Oct. 2010, pp. 799-805, 7 pages.
Shabayek, Shazy, et al., "Dynamic Model for Subcritical Combining Flows in Channel Junctions," Journal of Hydraulic Engineering, Sep. 2002, pp. 821-828, 8 pages.
Miranda, A.I.P., et al., "Steady and unsteady laminar flows of Newtonian and generalized Newtonian fluids in a planar T-junction," International Journal for Numerical Methods in Fluids, Nov. 13, 2007, pp. 295-328, 34 pages.
Smith, N.P., et al., "An Anatomically Based Model of Transient Coronary Blood Flow in the Heart," Society for Industrial and Applied Mathematics, SIAM J. Appl. Math., vol. 62, No. 3, pp. 990-1018, Published in 2002, 29 pages.
"Eclipse 2010 Reservoir Engineering Software," Schlumberger Solves reservoir engineering challenges, Published in 2010, 4 pages.
"Upwind scheme," Wikipedia, Last Modified Nov. 9, 2012, [retrieved on Jul. 10, 2013], Retrieved from the Internet <URL: https:// en.wikipedia.org/wiki/Upwind_scheme, 2 pages.
"Finite difference," Wikipedia, Last Modified Jun. 21, 2013, [retrieved on Jul. 10, 2013]. Retrieved from the Internet <URL: http://en.wikipedia.org/wiki/Finite_difference, 7 pages.
"Euler method," Wikipedia, Last Modified May 14, 2013, [retrieved on Jul. 10, 2013]. Retrieved from the Internet <URL: http://en.wikipedia.org/wiki/Euler_method, 10 pages.
Buijse et al., "A Semiempirical Model to Calculate Wormhole Growth in Carbonate Acidizing", SPE 96892, Published in 2005, 14 pages.
Glasbergen et al., "Field Validation of Acidizing Wormhole Models", SPE 94695, Published in 2005, 11 pages.
Pongratz et al., "Optimizing Matrix Acid Treatments in a Multilayered Reservoir in Russia by Applying Different Diversion Techniques", SPE 94485, Published in 2005, 15 pages.
Fulton et al., "Front-End Engineering Studies for Carbonate Stimulation Optimization", IPTC 10697, Published in 2005, 11 pages.
Stevenson et al., "Structured Approach to Matrix Stimulation Proves Successful in Oman", SPE 82261, Published in 2002, 10 pages.
Nitters et al., "Structured Approach to Advanced Candidate Selection and Treatment Design of Stimulation Treatments", SPE 63179, Published in 2000, 8 pages.
Jones et al., "Quantifying Acid Placement: The Key to Understanding Damage Removal in Horizontal Wells", SPE 50975, Aug. 1998, pp. 163-169.
Halliburton, "Insite for Stimulation Version 2.4.0P1 Software User's Manual for TCC 3000 and 5000 Data-Acquisition Systems," Part No. 101280731, dated Feb. 2007, 594 pages.
Halliburton, "Insite for Well Intervention V1.0.1 Software User's Manual," Part No. 101551873, dated Feb. 2006, 733 pages.

* cited by examiner

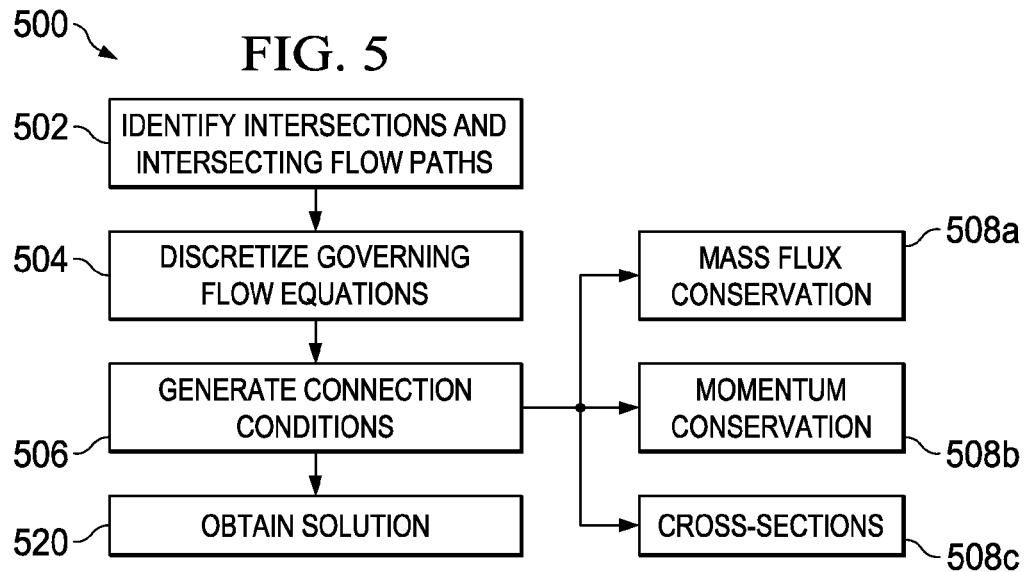
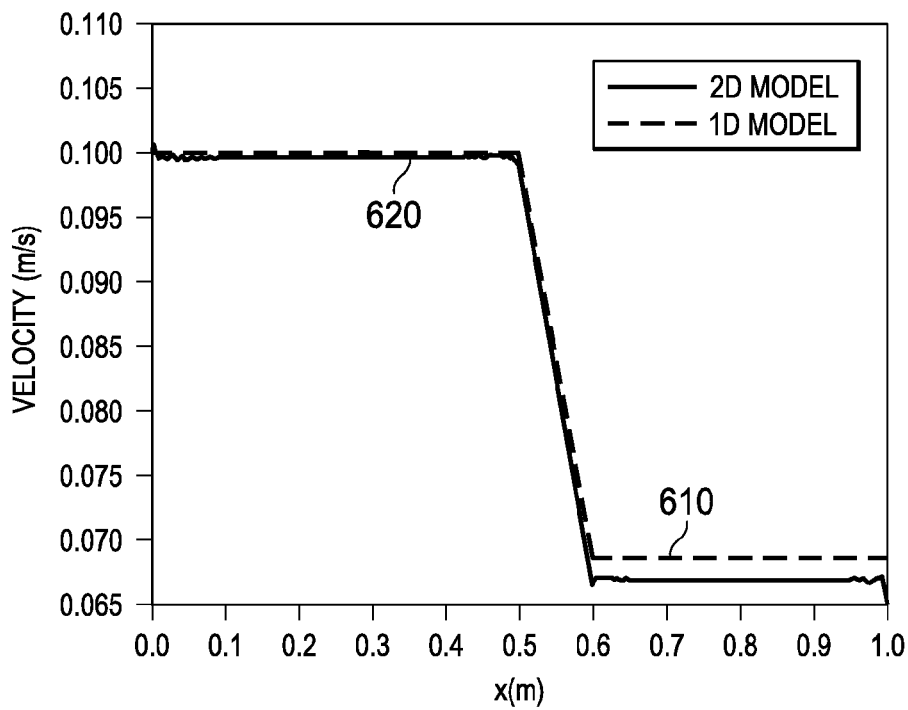

CONNECTION CONDITIONS FOR MODELING FLUID TRANSPORT IN A WELL SYSTEM ENVIRONMENT

BACKGROUND

The following description relates to connection conditions for modeling fluid transport in a well system environment, for example, in a fracture network in a subterranean region.

Flow models have been used to simulate fluid flow in hydraulic fracture treatments and other environments. During a conventional fracture treatment of a subterranean reservoir, pressurized fluid is communicated from a wellbore into the reservoir at high pressure, and the pressurized fluid propagates fractures within the reservoir rock. Flow models can be used to simulate the flow of fluid, for example, within a fracture network.

DESCRIPTION OF DRAWINGS

FIG. 5 is a flow chart showing an example technique for modeling fluid flow.

FIG. 6 is a plot showing velocity data from example numerical simulations.

Like reference symbols in the various drawings indicate like elements.

DETAILED DESCRIPTION

Fluid flow models can be used to analyze fluid flow, for example, in a well system environment (e.g., in a wellbore, a fracture network, within the reservoir rock matrix, in a well system tool, etc.) or other environments. In some environments, the fluid flow is unsteady and multi-dimensional (e.g., three-dimensional or at least two-dimensional). For example, in some types of fractures, the dominant flow is two-dimensional, and includes transient behaviors. In some instances, two- or three-dimensional flow can be described by a one-dimensional flow model, for example, by integrating the governing flow equations over the cross-section of the two- or three-dimensional flow path. In some cases, the resulting equations include nonlinear partial differential equations that can be solved using finite difference, finite volume, or finite element methods. In some cases, the use of one-dimensional flow models can reduce computational costs, and allow for faster or more computationally efficient simulations. In some instances, a flow model can be used to perform numerical simulations in real time, for example, during a fracture treatment or during another well system activity.

In some cases, a fluid flow model can provide an efficient, accurate prediction of the fluid pressure and fluid velocity distribution inside a fracture or another type of flow passage or junction. Some example flow models include flow path connection conditions to accurately simulate fluid flow at an intersection of multiple flow path branches. In some implementations, flow path connection conditions can be used in one-dimensional flow models, and the one-dimensional flow model can capture behavior described by two-dimensional or three-dimensional flow models.

In some cases, a fluid flow model models the flow of fluid in a fracture, for example, during a hydraulic fracturing treatment or another type of injection treatment. Hydraulic fracturing can improve the conductivity of a hydrocarbon reservoir, and modeling the hydraulic fracturing treatment can help to efficiently design, analyze, or optimize the treatment. In some cases, a hydraulic fracturing model combines simulations of fracture propagation, rock deformation, fluid flow, proppant transport, and other phenomena. The fluid flow models used in these and other types of simulations can account for the complex physical environments and conditions associated with some hydraulic fracturing activities. For example, in cases where the fluid pressure in the fractures and the rock deformation are implicitly coupled, the flow models can interact such that the solution of one model affects the other. As another example, some subterranean formations include low-permeability, naturally-fracture rock media, and the flow models can model a discrete or complex fracture network where the induced fractures interact with natural fractures. Other types of environments and conditions can be modeled.

Figure 1:
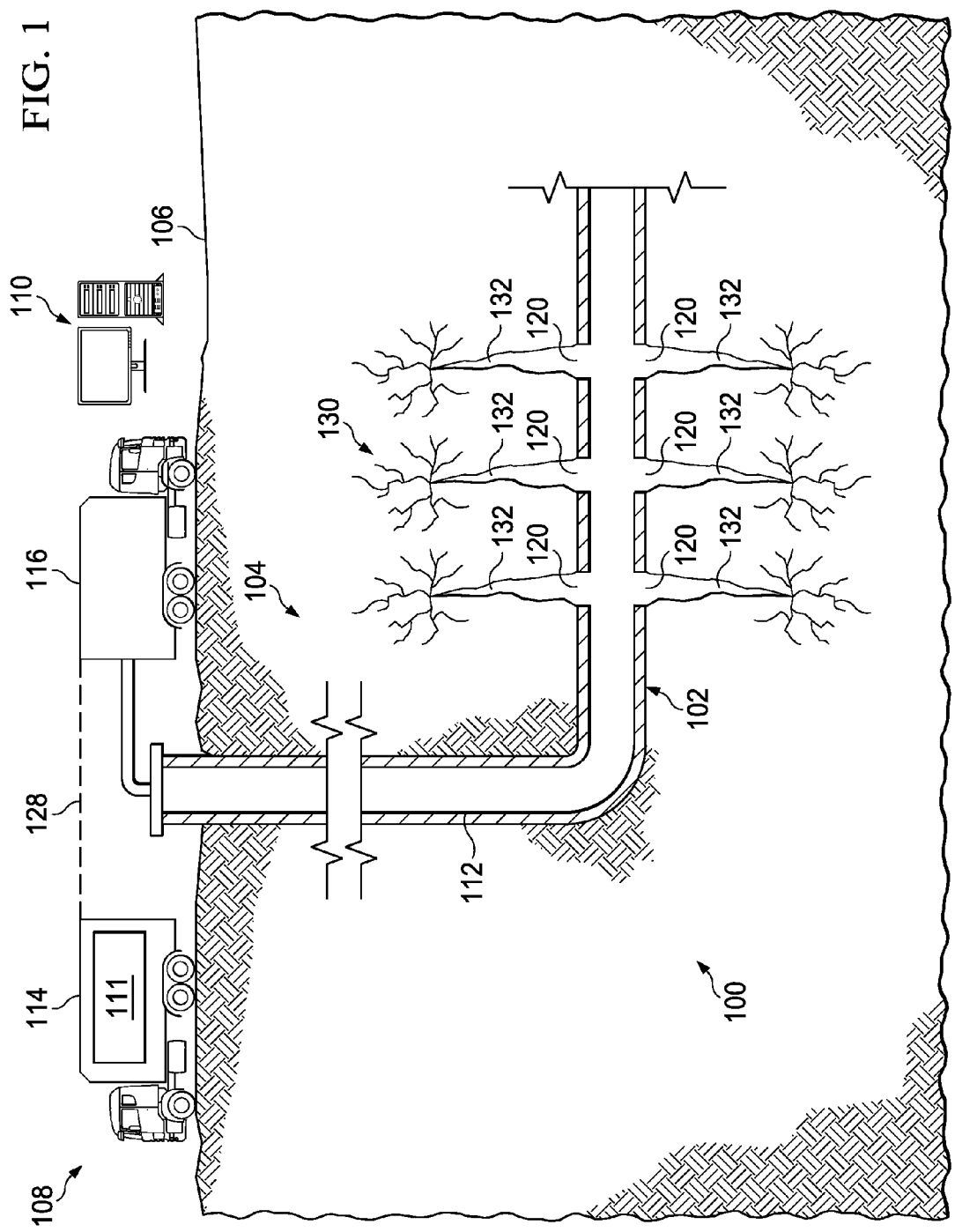
FIG. 1 is a schematic diagram of an example well system.

FIG. 1 is a diagram of an example well system 100 and a computing subsystem 110. The example well system 100 includes a wellbore 102 in a subterranean region 104 beneath the ground surface 106. The example wellbore 102 shown in FIG. 1 includes a horizontal wellbore. However, a well system may include any combination of horizontal, vertical, slant, curved, or other wellbore orientations. The well system 100 can include one or more additional treatment wells, observation wells, or other types of wells.

The computing subsystem 110 can include one or more computing devices or systems located at the wellbore 102 or other locations. The computing subsystem 110 or any of its components can be located apart from the other components shown in FIG. 1. For example, the computing subsystem 110 can be located at a data processing center, a computing facility, or another suitable location. The well system 100 can include additional or different features, and the features of the well system can be arranged as shown in FIG. 1 or in another configuration.

The example subterranean region 104 may include a reservoir that contains hydrocarbon resources, such as oil, natural gas, or others. For example, the subterranean region 104 may include all or part of a rock formation (e.g., shale, coal, sandstone, granite, or others) that contain natural gas. The subterranean region 104 may include naturally fractured rock or natural rock formations that are not fractured to any significant degree. The subterranean region 104 may include tight gas formations that include low permeability rock (e.g., shale, coal, or others).

The example well system 100 shown in FIG. 1 includes an injection system 108. The injection system 108 can be used to perform an injection treatment, whereby fluid is injected into the subterranean region 104 through the wellbore 102. In some instances, the injection treatment fractures part of a rock formation or other materials in the subterranean region 104. In such examples, fracturing the rock may increase the surface area of the formation, which may increase the rate at which the formation conducts fluid resources to the wellbore 102.

The example injection system 108 can inject treatment fluid into the subterranean region 104 from the wellbore 102. For example, a fracture treatment can be applied at a single fluid injection location or at multiple fluid injection locations in a subterranean zone, and the fluid may be injected over a single time period or over multiple different time periods. In some instances, a fracture treatment can use multiple different fluid injection locations in a single wellbore, multiple fluid injection locations in multiple different wellbores, or any suitable combination. Moreover, the fracture treatment can inject fluid through any suitable type of wellbore, such as, for example, vertical wellbores, slant wellbores, horizontal wellbores, curved wellbores, or combinations of these and others.

The example injection system 108 includes instrument trucks 114, pump trucks 116, and an injection treatment control subsystem 111. The example injection system 108 may include other features not shown in the figures. The injection system 108 may apply injection treatments that include, for example, a multi-stage fracturing treatment, a single-stage fracture treatment, a mini-fracture test treatment, a follow-on fracture treatment, a re-fracture treatment, a final fracture treatment, other types of fracture treatments, or a combination of these.

The pump trucks 116 can include mobile vehicles, immobile installations, skids, hoses, tubes, fluid tanks, fluid reservoirs, pumps, valves, mixers, or other types of structures and equipment. The example pump trucks 116 shown in FIG. 1 can supply treatment fluid or other materials for the injection treatment. The example pump trucks 116 can communicate treatment fluids into the wellbore 102 at or near the level of the ground surface 106. The treatment fluids can be communicated through the wellbore 102 from the ground surface 106 level by a conduit installed in the wellbore 102. The conduit 112 may include casing cemented to the wall of the wellbore 102. In some implementations, all or a portion of the wellbore 102 may be left open, without casing. The conduit 112 may include a working string, coiled tubing, sectioned pipe, or other types of conduit.

The instrument trucks 114 can include mobile vehicles, immobile installations, or other suitable structures. The example instrument trucks 114 shown in FIG. 1 include an injection treatment control subsystem 111 that controls or monitors the injection treatment applied by the injection system 108. The communication links 128 may allow the instrument trucks 114 to communicate with the pump trucks 116, or other equipment at the ground surface 106. Additional communication links may allow the instrument trucks 114 to communicate with sensors or data collection apparatus in the well system 100, remote systems, other well systems, equipment installed in the wellbore 102 or other devices and equipment. In some implementations, communication links allow the instrument trucks 114 to communicate with the computing subsystem 110, which may run simulations and provide simulation data. The well system 100 can include multiple uncoupled communication links or a network of coupled communication links. The communication links can include wired or wireless communications systems, or a combination thereof.

The injection system 108 may also include surface and down-hole sensors to measure pressure, rate, temperature or other parameters of treatment or production. For example, the injection system 108 may include pressure meters or other equipment that measure the pressure of fluids in the wellbore 102 at or near the ground surface 106 level or at other locations. The injection system 108 may include pump controls or other types of controls for starting, stopping, increasing, decreasing or otherwise controlling pumping as well as controls for selecting or otherwise controlling fluids pumped during the injection treatment. The injection treatment control subsystem 111 may communicate with such equipment to monitor and control the injection treatment.

The injection system 108 may inject fluid into the formation above, at or below a fracture initiation pressure for the formation; above, at or below a fracture closure pressure for the formation; or at another fluid pressure. Fracture initiation pressure may refer to a minimum fluid injection pressure that can initiate or propagate fractures in the subterranean formation. Fracture closure pressure may refer to a minimum fluid injection pressure that can dilate existing fractures in the subterranean formation. In some instances, the fracture closure pressure is related to the minimum principle stress acting on the formation.

The example injection treatment control subsystem 111 shown in FIG. 1 controls operation of the injection system 108. The injection treatment control subsystem 111 may include data processing equipment, communication equipment, or other systems that control injection treatments applied to the subterranean region 104 through the wellbore 102. The injection treatment control subsystem 111 may be communicably linked to the computing subsystem 110, which may calculate, select, or optimize fracture treatment parameters for initialization, propagation, or opening fractures in the subterranean region 104. The injection treatment control subsystem 111 may receive, generate or modify an injection treatment plan (e.g., a pumping schedule) that specifies properties of an injection treatment to be applied to the subterranean region 104.

In the example shown in FIG. 1, an injection treatment has fractured the subterranean region 104. FIG. 1 shows examples of dominant fractures 132 formed by fluid injection through perforations 120 along the wellbore 102. Generally, the fractures can include fractures of any type, number, length, shape, geometry or aperture. Fractures can extend in any direction or orientation, and they may be formed at multiple stages or intervals, at different times or simultaneously. The example dominant fractures 132 shown in FIG. 1 extend through natural fracture networks 130. Generally, fractures may extend through naturally fractured rock, regions of un-fractured rock, or both. The injected fracturing fluid can flow from the dominant fractures 132, into the rock matrix, into the natural fracture networks 130, or in other locations in the subterranean region 104. The injected fracturing fluid can, in some instances, dilate or propagate the natural fractures or other pre-existing fractures in the rock formation.

In some implementations, the computing subsystem 110 can simulate fluid flow in the well system 100. For example, the computing subsystem 110 can include flow models for simulating fluid flow in or between various locations of fluid flow in the well system, such as, for example, the wellbore 102, the perforations 120, the conduit 112 or components thereof, the dominant fractures 132, the natural fracture networks 130, the rock media in the subterranean region 104, or a combination of these and others. The flow models can model the flow of incompressible fluids (e.g., liquids), compressible fluids (e.g., gases), or a combination multiple fluid phases. In some instances, the flow models can model flow in one, two, or three spatial dimensions. The flow models can include nonlinear systems of differential or partial differential equations.

In some implementations, flow models can be used to simulate the flow of fluid through an intersection of multiple flow paths. For example, flow models can use connection conditions to model fluid dynamics at flow path intersections. The connection conditions can represent the physical conditions of the flow path branches that meet at the respective intersections. In some examples, the connection conditions are configured to conserve one or more physical quantities, such as, for example, fluid momentum, fluid mass flux, etc., at the flow path intersection. The computing subsystem 110 can use the flow models to predict, describe, or otherwise analyze the dynamic behavior of fluid in the well system 100.

The computing subsystem 110 can perform simulations before, during, or after the injection treatment. In some implementations, the injection treatment control subsystem 111 controls the injection treatment based on simulations performed by the computing subsystem 110. For example, a pumping schedule or other aspects of a fracture treatment plan can be generated in advance based on simulations performed by the computing subsystem 110. As another example, the injection treatment control subsystem 111 can modify, update, or generate a fracture treatment plan based on simulations performed by the computing subsystem 110 in real time during the injection system.

In some cases, the simulations are based on data obtained from the well system 100. For example, pressure meters, flow monitors, microseismic equipment, tiltmeters, or other equipment can perform measurements before, during, or after an injection treatment; and the computing subsystem 110 can simulate fluid flow based on the measured data. In some cases, the injection treatment control subsystem 111 can select or modify (e.g., increase or decrease) fluid pressures, fluid densities, fluid compositions, and other control parameters based on data provided by the simulations. In some instances, data provided by the simulations can be displayed in real time during the injection treatment, for example, to an engineer or other operator of the well system 100.

Some of the techniques and operations described herein may be implemented by a one or more computing systems configured to provide the functionality described. In various instances, a computing system may include any of various types of devices, including, but not limited to, personal computer systems, desktop computers, laptops, notebooks, mainframe computer systems, handheld computers, workstations, tablets, application servers, computer clusters, storage devices, or any type of computing or electronic device.

Figure 2:
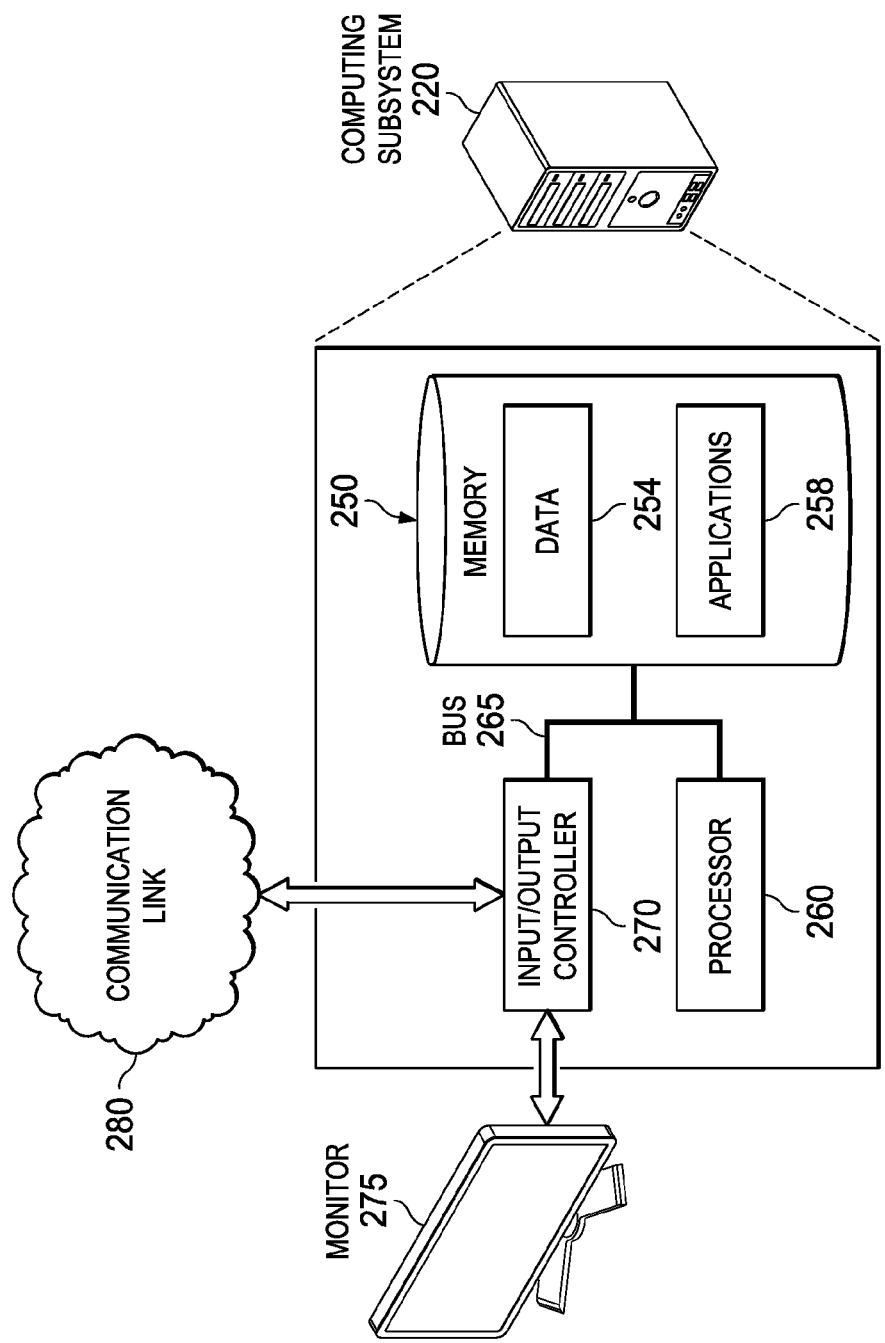
FIG. 2 is a schematic diagram of an example computing system.

FIG. 2 is a diagram of an example computing system 200. The example computing system 200 can operate as the example computing subsystem 110 shown in FIG. 1, or it may operate in another manner. For example, the computing system 200 can be located at or near one or more wells of a well system or at a remote location apart from a well system. All or part of the computing system 200 may operate independent of a well system or well system components. The example computing system 200 includes a memory 250, a processor 260, and input/output controllers 270 communicably coupled by a bus 265. The memory 250 can include, for example, a random access memory (RAM), a storage device (e.g., a writable read-only memory (ROM) or others), a hard disk, or another type of storage medium. The computing system 200 can be preprogrammed or it can be programmed (and reprogrammed) by loading a program from another source (e.g., from a CD-ROM, from another computer device through a data network, or in another manner). In some examples, the input/output controller 270 is coupled to input/output devices (e.g., a monitor 275, a mouse, a keyboard, or other input/output devices) and to a communication link 280. The input/output devices can receive or transmit data in analog or digital form over communication links such as a serial link, a wireless link (e.g., infrared, radio frequency, or others), a parallel link, or another type of link.

The communication link 280 can include any type of communication channel, connector, data communication network, or other link. For example, the communication link 280 can include a wireless or a wired network, a Local Area Network (LAN), a Wide Area Network (WAN), a private network, a public network (such as the Internet), a WiFi network, a network that includes a satellite link, or another type of data communication network.

The memory 250 can store instructions (e.g., computer code) associated with an operating system, computer applications, and other resources. The memory 250 can also store application data and data objects that can be interpreted by one or more applications or virtual machines running on the computing system 200. As shown in FIG. 2, the example memory 250 includes data 254 and applications 258. The data 254 can include treatment data, geological data, fracture data, fluid data, or any other appropriate data. The applications 258 can include flow models, fracture treatment simulation software, reservoir simulation software, or other types of applications. In some implementations, a memory of a computing device includes additional or different data, application, models, or other information.

In some instances, the data 254 include treatment data relating to fracture treatment plans. For example the treatment data can indicate a pumping schedule, parameters of a previous injection treatment, parameters of a future injection treatment, or parameters of a proposed injection treatment. Such parameters may include information on flow rates, flow volumes, slurry concentrations, fluid compositions, injection locations, injection times, or other parameters.

In some instances, the data 254 include geological data relating to geological properties of a subterranean region. For example, the geological data may include information on wellbores, completions, or information on other attributes of the subterranean region. In some cases, the geological data includes information on the lithology, fluid content, stress profile (e.g., stress anisotropy, maximum and minimum horizontal stresses), pressure profile, spatial extent, or other attributes of one or more rock formations in the subterranean zone. The geological data can include information collected from well logs, rock samples, outcroppings, microseismic imaging, or other data sources.

In some instances, the data 254 include fracture data relating to fractures in the subterranean region. The fracture data may identify the locations, sizes, shapes, and other properties of fractures in a model of a subterranean zone. The fracture data can include information on natural fractures, hydraulically-induced fractures, or any other type of discontinuity in the subterranean region. The fracture data can include fracture planes calculated from microseismic data or other information. For each fracture plane, the fracture data can include information (e.g., strike angle, dip angle, etc.) identifying an orientation of the fracture, information identifying a shape (e.g., curvature, aperture, etc.) of the fracture, information identifying boundaries of the fracture, or any other suitable information.

In some instances, the data 254 include fluid data relating to well system fluids. The fluid data may identify types of fluids, fluid properties, thermodynamic conditions, and other information related to well system fluids. The fluid data can include flow models for compressible or incompressible fluid flow. For example, the fluid data can include systems of governing equations (e.g., Navier-Stokes equation, continuity equation, etc.) that represent fluid flow generally or fluid flow under certain types of conditions. In some cases, the governing flow equations define a nonlinear system of equations. The fluid data can also be used to generate connection conditions. The fluid data can include data related to native fluids that naturally reside in a subterranean region, treatment fluids to be injected into the subterranean region, hydraulic fluids that operate well system tools, or other fluids that may or may not be related to a well system.

The applications 258 can include software applications, scripts, programs, functions, executables, or other modules that are interpreted or executed by the processor 260. For example, the applications 258 can include a fluid flow simulation module, a hydraulic fracture simulation module, a reservoir simulation module, or another other type of simulator. The applications 258 may include machine-readable instructions for performing one or more of the operations related to FIGS. 3-5. The applications 258 may include machine-readable instructions for generating a user interface or a plot, for example, illustrating fluid flow or fluid properties. The applications 258 can receive input data, such as treatment data, geological data, fracture data, fluid data, or other types of input data, from the memory 250, from another local source, or from one or more remote sources (e.g., via the communication link 280). The applications 258 can generate output data and store the output data in the memory 250, in another local medium, or in one or more remote devices (e.g., by sending the output data via the communication link 280).

The processor 260 can execute instructions, for example, to generate output data based on data inputs. For example, the processor 260 can run the applications 258 by executing or interpreting the software, scripts, programs, functions, executables, or other modules contained in the applications 258. The processor 260 may perform one or more of the operations related to FIGS. 3-5. The input data received by the processor 260 or the output data generated by the processor 260 can include any of the treatment data, the geological data, the fracture data, or any other data.

Figure 3:
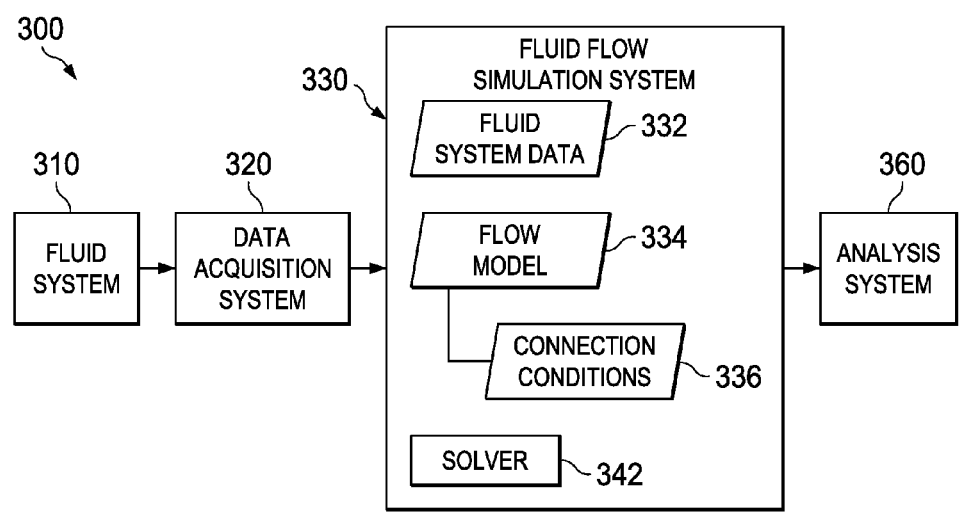
FIG. 3 is a diagram of an example system architecture.

FIG. 3 is a diagram of an example system architecture 300. The example system architecture 300 can be used to model physical phenomena related to a well system environment. For example, the architecture 300 can be used to model fluid flow in an injection treatment of the subterranean region 104 shown in FIG. 1. In some instances, the architecture 300 is used to model fluid flow and other aspects of an injection treatment or other activities in a well system. In some cases, the architecture 300 is used to model fluid flow within or between one or more wellbores, wellbore conduits, wellbore tools, wellbore perforations, reservoir rock media, reservoir fractures (e.g., fractures in a complex fracture network, in a dominant bi-wing fracture extending from a wellbore, in a natural fracture network, in hydraulically-induced fractures, etc.), or combinations of these and other types of flow paths in a well system environment.

The example architecture 300 shown in FIG. 3 includes a fluid system 310, a data acquisition system 320, a fluid flow simulation system 330, and an analysis system 360. The architecture 300 can include additional or different components or subsystems, and the example components shown in FIG. 3 can be combined, integrated, divided, or configured in another manner. For example, the fluid flow simulation system 330 and the analysis system 360 can be subcomponents of an integrated computing system (e.g., the computing system 200 shown in FIG. 2) or multiple computing systems; or the data acquisition system 320 can be integrated with the fluid system 310. As another example, the fluid flow simulation system 330 or the analysis system 360, or both, can be implemented in a computing system that operates independent of the fluid system 310 or the data acquisition system 320.

The example fluid system 310 can include any physical system where fluid flow or other fluid phenomena occur. The fluid system 310 can represent a well system environment (e.g., the well system 100 shown in FIG. 1) or a subset of well system components or subsystems (e.g., the injection system 108 shown in FIG. 1). The fluid system 310 can include the physical reservoir rock in a subterranean reservoir (e.g., the subterranean region 104 shown in FIG. 1), fractures or a fracture network in the reservoir rock, one or more downhole systems installed in a wellbore, or a combination of them.

The data acquisition system 320 can include systems or hardware that obtain data from the fluid system 310. For example, the data acquisition system 320 can include flow sensors, pressure sensors, temperature sensors, and other types of measurement devices. The data acquisition system 320 can include communication and data storage systems that store, transfer, manipulate, or otherwise manage the information obtained from the fluid system 310. In some examples, the data acquisition system 320 obtains fluid pressure data for one or more points on a flow path in the fluid system 310.

The fluid flow simulation system 330 can include one or more computer systems or computer-implemented programs that simulate fluid flow. The fluid flow simulation system 330 can receive information related to the fluid system 310 and simulate fluid flow and other fluid phenomena that occur in the fluid system 310. For example, the fluid flow simulation system 330 can calculate flow velocities or other aspects of fluid flow based on data from the data acquisition system 320 or another source.

The example fluid flow simulation system 330 includes fluid system data 332, flow models 334, and a solver 342. The fluid flow simulation system can include additional or different features, and the features of a fluid flow simulation system 330 can be configured to operate in another manner. The modules of the fluid flow simulation system 330 can include hardware modules, software modules, or other types of modules. In some cases, the modules can be integrated with each other or with other system components. In some example implementations, the fluid flow simulation system 330 can be implemented as software running on a computing system, and the modules of the fluid flow simulation system 330 can be implemented as software functions or routines that are executed by the computing system.

The fluid system data 332 can include any information related to the fluid system 310 or another fluid system. For example, the fluid system data 332 can indicate physical properties (e.g., geometry, cross-sectional areas, surface properties, etc.) of one or more flow paths in the fluid system 310, material properties (e.g., density, viscosity, Reynolds number, etc.) of one or more fluids in the fluid system 310, thermodynamic data (e.g., fluid pressures, fluid temperatures, fluid flow rates, etc.) measured at one or more locations in the fluid system 310, and other types of information. The fluid system data 332 can include information received from the data acquisition system 320 and other sources.

The flow models 334 can include any information or modules that can be used to simulate fluid flow. The flow models 334 can include governing equations, spatial and temporal discretization data, or other information. In some examples, the flow models 334 include governing flow equations, such as, for example, the Navier-Stokes equation or related approximations of the Navier-Stokes equation, continuity equations, or other types of flow equations. As an example, the flow models 334 may include Equations (1), (3) and (5) below; or the flow models 334 may include additional or different governing flow equations.

The flow models 334 can include spatial discretization data, such as, for example, discrete nodes that represent locations of fluid flow along flow paths in the fluid system 310. Generally, the flow models 334 can represent any number of intersecting flow path branches, including any type of flow path intersection. In some cases, the flow path branches represent a fracture network in a subterranean region, and connectivity between the flow path branches can correspond to the fracture connectivity in the fracture network. In some cases, the flow paths represent flow conduits in a wellbore, perforations in a wellbore casing, hydraulic fractures extending from a wellbore, natural fractures connected to hydraulic fractures or a wellbore, or other types of interconnected flow paths in a well system environment.

Each of the flow paths can be represented by multiple discrete nodes, and some of the nodes can be shared among multiple flow paths. For example, in some cases, three or more flow path branches intersect at a single intersection node. In some cases, the intersection is not located at a node. For example, the flow path intersection can be modeled by the nodes of the respective branches in the vicinity of the intersection, which may or may not include a node at the intersection.

The spatial discretization of the flow paths can be implemented by any suitable algorithm. For example, the system can be discretized according to a finite difference model, a finite volume model, finite element model, or another technique. The system can be discretized in a manner that permits spatial derivatives or partial spatial derivatives to be solved in the discretized spatial domain using numerical methods. In some implementations, the central difference method can be used in the spatial domain. In some implementations, the flow models 334 can include boundary condition data indicating a type of boundary condition to be used in modeling fluid flow.

As shown in FIG. 3, the fluid flow simulation system 330 can also include connection conditions 336 which can be included as part of the flow model 334 or can be generated based on flow model data. The connection conditions 336 can describe the physical conditions of the branches in the vicinity of an intersection. The connection conditions 336 can be associated with one or more nodes or branches. The connection conditions 336 can include one or more equations, data, or parameters. For example, the connection conditions 336 can be based on equations for conservation of fluid mass flux or conservation of fluid momentum at the nodes in the vicinity of the intersection. The connection conditions 336 can be stored in memory, communicated to another system or model, or incorporated into an algorithm.

The connection conditions 336 can be generated, stored, or proved by a connection conditions module. The connection conditions module can be a software module, hardware module, a combination of these, or another type of modules. The connection conditions module can be part of fluid flow simulation system 330 or part of another module.

In some implementations, the fluid flow simulation system 330 can also include a time marching module to perform calculations in a discretized time domain. For example, the governing flow equations may include derivatives or partial derivatives in the time domain, and the time marching module can calculate such quantities based on a time marching algorithm. Example time marching schemes include the backward Euler scheme, the Crank-Nicolson scheme, and others.

The solver 342 can include any information or modules that can be used to solve a system of equations. For example, the solver 342 can be a direct solver or another type of solver. In some implementations, the solver 342 receives inputs from the other components of the fluid flow simulation system 330. For example, the inputs can include the discretized governing flow equations, the connection conditions 336, the fluid system data 332, or any other information. The inputs can also include data generated or reported from a separate simulation or model. The solver 342 can generate a numerical solution for a variable of interest based on the inputs.

The solution can be generated for some or all of the nodes in a discretized spatial domain. For example, the solver 342 may calculate values of fluid velocity, fluid pressure, or another variable over a spatial domain; the values can be calculated for an individual time step or multiple time steps. In some implementations, the solver 342 obtains a solution by executing the example process 500 shown in FIG. 5, or the solver 342 can obtain a solution using another technique.

The analysis system 360 can include any systems, components, or modules that analyze, process, use, or access the simulation data generated by the fluid flow simulation system 330. For example, the analysis system 360 can be a real time analysis system that displays or otherwise presents fluid data (e.g., to a field engineer, etc.) during an injection treatment. In some cases, the analysis system 360 includes other simulators or a simulation manager that use the fluid simulation data to simulate other aspects of a well system. For example, the analysis system 360 can be a fracture simulation suite that simulates fracture propagation based on the simulated fluid flow data generated by the fluid flow simulation system 330. As another example, the analysis system 360 can be a reservoir simulation suite that simulates fluid migration in a reservoir based on the simulated fluid flow data generated by the fluid flow simulation system 330.

Figure 4:
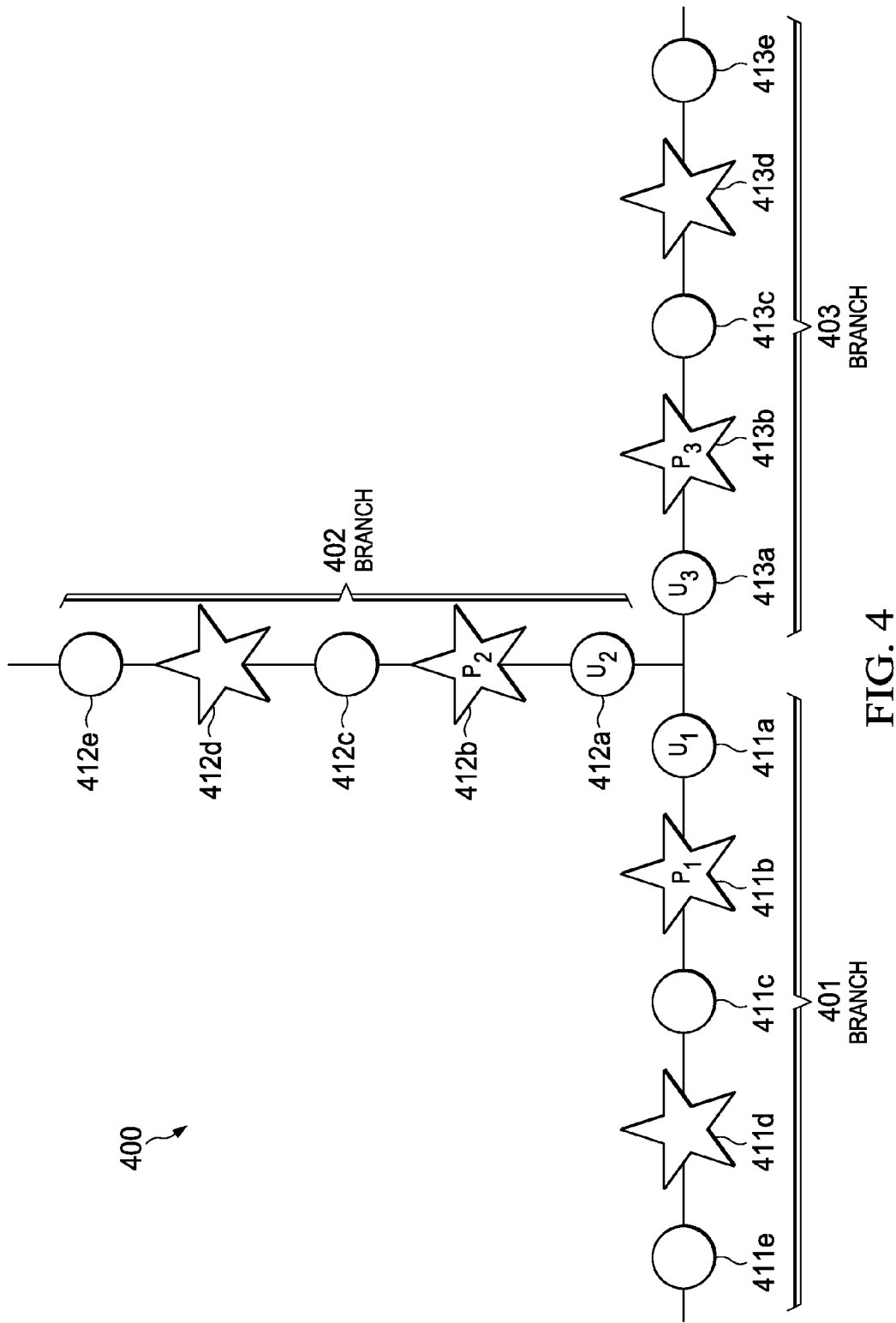
FIG. 4 is a diagram showing aspects of an example flow model.

FIG. 4 is a diagram showing aspects of an example fluid flow model 400. The fluid flow model 400 shown in FIG. 4 is an example of a one-dimensional flow model that includes multiple intersecting flow paths. The example flow model 400 includes three flow path branches 401, 402, 403. Fluid can flow in any direction in the flow path branches. In some instances, fluid may flow from one flow path branch into the other two, or from two branches into one branch. In some instances, fluid may remain static in one or more of the branches.

In some cases, one or more of the branches can be designated or identified as an inlet branch or an outlet branch. In some examples, branch 401 represents the inlet branch and fluid flows from branch 401 into branches 402, 403. As such, example branch 401 can be considered the "upstream" branch, and example branches 402, 403 can be considered the "downstream" branches.

The branches 401, 402, 403 can intersect at any angle, and they can extend in any direction. The example fluid flow model 400 shown in FIG. 4 has three branches, though the one-dimensional flow model can include two branches, four branches, or another number of branches. The flow path branches can extend through one, two, or three spatial dimensions. As such, the spatial dimension of a one-dimensional flow model does not necessarily correspond to a single physical spatial dimension. In some cases, a one-dimensional flow model can incorporate flow in more than one spatial dimension, for example, to account for intersecting flow paths, curved flow paths, etc.

The example one-dimensional fluid flow model 400 shown in FIG. 4 includes multiple nodes and staggered points located along each branch 401, 402, 403. Nodes and staggered points can represent discrete locations along flow paths. In some cases, nodes and staggered points represent locations where fluid flow values (e.g. pressure, flow velocity) are calculated.

In FIG. 4, the example nodes 411*a*, 411*c*, 411*e*, 412*a*, 412*c*, 412*e*, 413*a*, 413*c*, 413*e* are represented by circles. The nodes in the example branches 401, 402, 403 can be a sequence of flow locations that extend through one, two, or three spatial dimensions. In this example one-dimensional fluid flow model, the nodes represent discrete locations where fluid velocity values are calculated. In some cases, other variables may be calculated at the nodes.

The example flow model 400 shown in FIG. 4 also includes staggered points. In FIG. 4, the staggered points 411*b*, 411*d*, 412*b*, 412*d*, 413*b*, 413*d* are represented by stars. In the example shown, each staggered point is located between two nodes, though staggered points can be located at any positions along any flow paths. In this example one-dimensional fluid flow model, staggered points represent locations where fluid pressure values are calculated. In some cases, other variables may be calculated at the staggered points.

In some cases, the cross-sectional area of the flow path branches in the junction domain can be small compared to the overall length of each flow path. Thus, the fluid flow in each of the flow path branches can exhibit close to one-dimensional characteristics. The fluid in the junction can satisfy certain physical constrains such as mass conservation or momentum conservation. The connection conditions of the intersection can be based on the mass conservation, the momentum conservation, or other physical properties of the intersection. The connection conditions of the intersection can be used when calculating physical properties of the fluid in each flow path of the intersection, such as fluid pressure or fluid velocity.

In some implementations, the one-dimensional fluid flow model includes the connection conditions of a junction domain. The connection conditions of the junction domain can describe physical qualities of the fluid in the flow path branches at the intersection. In the example one-dimensional fluid flow model shown in FIG. 4, the connection condition for the junction domain is derived from two independent conservation quantities: the conservation of the overall flow's mass flux through the junction domain and the conservation of the momentum of the flows along the various flow path branches at the junction domain. Other conservation quantities or physical qualities (e.g. temperature) can be used to derive connection conditions.

The connection conditions can mathematically connect the fluid flow's characteristics of each of the flow path branches at the vicinity of the entrance to the junction domain to each other. The connection condition at the junction can be based on the finite difference framework. For example, the connection conditions can fit computational algorithms for implicit time solutions. The connection conditions can be developed based on preserving the flows' mass flux and the flows' momentum components without frictional loss.

In the example flow model 400, at any discrete point along the branches, the conservation of mass flux can be described by Equation (1):

$$\frac{\partial(A_i\rho_f)}{\partial t} + \frac{\partial(A_i\rho_f U_i)}{\partial x} = 0. \quad (1)$$

In Equation (1), A represents the cross-sectional area of the flow path branch, U represents the velocity of the flow, and $\rho_f$ is the fluid density; the subscript "i" designates the node for which the equation is applied. Equation (1) is an example of a mass flux conservation equation or continuity equation that describes a flow of compressible or incompressible fluid, where the difference between the mass flowing into a volume and the mass flowing out of the same volume is balanced by the generation of the appropriate mass of fluid at this specific time.

In some cases, for a given junction or intersection, there are multiple connection conditions. For example, one of the connection conditions can related to the fluids' mass conservation, and the other related to the momentum conservation. Other connection conditions can also be used. For example, in some cases, one or more connection conditions are related to conservation of quantities such as temperature, proppant, etc.

In some cases, a connection condition that conserves overall mass can be generated. For the example fluid flow model in FIG. 4, this connection condition for a steady state condition can be represented by the following equation:

$$A_1U_1 - A_2U_2 - A_3U_3 = 0. \quad (2)$$

The example, mass conservation Equation (2) indicates that the total flow entering the junction domain ($A_1U_1$) equals the total flow leaving the junction domain ($A_2U_2+A_3U_3$). The "1," "2," and "3" subscripts refer to branches 401, 402, and 403 respectively. For the example fluid flow model 400, the flow enters the junction domain from branch 401, and exits the junction domain via branches 402, 403. A one-dimensional mass conservation equation for an arbitrary number of flow path branches can be expressed as:

$$\sum_{k=1}^{\substack{\text{number of} \\ \text{branches}}} A_k U_k = 0. \quad (3)$$

In Equations (2) and (3), the flow velocities can be defined relative to the intersection or another reference point. In Equation (2) flow velocity parameters $U_2$ and $U_3$ have negative signs because branches 402 and 403 are assumed to be outlet branches; and velocity parameter $U_1$ has a positive sign because branch 401 is assumed to be an inlet branch. In Equation (3), the term $A_k U_k$ carries a positive sign when the flow moves into the intersection, and negative otherwise. In some cases, none of the branches is assumed to be an inlet or an outlet, and the flow velocity variable can be defined with a default orientation.

In some cases, a connection condition that conserves momentum at the flow intersection can be generated. The connection condition can be integrated into the system of equations in order to uniquely determine the condition of the flows at the intersection. For the example fluid flow model 400, the conservation of the steady-state momentum between branch 401 and branch 402 can be expressed as:

$$A_2\rho_f U_2^2 = A_1P_1 - A_2P_2 + A_1\rho_f U_1^2. \quad (4)$$

In Equation (4), the pressure is represented by P, and the other variables are the same as previously described. The subscript "1" refers to branch 401 and the subscript "2" refers to branch 402. In this example, Equation (4) describes the momentum balance between branches 401 and 402 while ignoring effects due to friction and other diffusion effects due to the small size of the intersection region. A one-dimensional momentum conservation equation between two arbitrary branches can be expressed as:

$$A_i(P_i+\rho U_i^2)N_{ij}=A_j(P_j+\rho U_j^2). \quad (5)$$

In Equation (5), i and j are the designated branch numbers between which the connection condition is applied. The parameter $N_{ij}$ represents the directional influence of the flow momentum in branch i on the flow momentum in branch j. The parameter $N_{ij}$ can depend on the angle between the two branches. In some implementations, it can be assumed that the influence of vertical momentum is very small due to the small apertures, and thus it can be assumed that $N_{ij}=1$ for any i and j. Any major angle effects can be taken into consideration by the preferred flow path branch, for example, as described below. Equation (5) can be generalized for the unsteady case.

In the example one-dimensional fluid flow model 400, the mass flux conservation Equations (1) and (3) are associated with staggered points. The momentum conservation Equations (5) are associated with the nodes. This "staggered grid" strategy can avoid collocated pressure-velocity coupling in the model that can cause computational instabilities. The values for fluid velocity are collocated at the nodes, and the values for pressure are collocated at the staggered points. For example, in the example model 400, fluid velocities can be calculated for nodes 411a, 412a, 413a, and pressures can be calculated for staggered points 411b, 412b, 413b.

A one-dimensional fluid flow model can describe intersections with more than three flow path branches. For example, if more than two downstream flow path branches take in fluid from a single upstream flow path branch, the model can be applied to fluid flow with respect to a preferred flow path branch. A preferred flow path branch is a flow path branch that takes in most of the fluid. The preferred flow path branch can be determined based on the orientation or the flow path angle. For example, the preferred flow path branch can be a flow path branch with a small flow path angle. The one-dimensional fluid flow model can be extended to any number of flow path branches based on the flow path angle. If a single flow path branch takes in fluid from one or more flow path branches, the overall continuity Equations (3) and (5) can suffice in some instances.

In some implementations, effects due to convection can be neglected. In such cases, there is no loss of momentum due to convection. Thus, the steady-state momentum conservation Equation (5) can be reduced to:

$$A_iP_i=A_jP_j \quad (6)$$

In Equation (6), the i and j subscripts are used to designate two separate flow path branches. Near the intersection, branches with similar cross-sectional areas can have similar pressures. In some cases, a main branch or preferred branch approximation can be used for the momentum conservation.

Various numerical techniques can be applied for computing the pressures and velocities of fluid at nodes and staggered points. For example, backward Euler finite-difference approximations can be used for time discretization, and a second-order upwind finite difference technique can be used for approximating the convection at all interior points. As another example, second-order central finite difference methods can be used for computing pressure values or evaluating the mass conservation equations. These or other approximation techniques can be used for numerical computation.

A one-dimensional fluid flow model for the intersection can communicate or interface with a separate model or simulation. For example, a one-dimensional fluid flow model can be implemented to simulate the fluid flow at the intersections, whereas the separate model can implement simulations of other parts of the system (e.g., an interior flow path away from the intersection, or another flow path). The separate model can be a different model than the one-dimensional fluid flow model for intersections. For example, the separate model can be a two-dimensional or three-dimension model. The separate model can communicate junction boundary conditions or other data to the one-dimensional fluid flow model. A one-dimensional fluid flow model can be used to calculate behavior at the junctions and communicate the results to the separate model.

In some instances, two or more separate models will share variables at the interfaces between the models. For example, a junction model (that represents the intersection of two flow paths) and the interior models (that represent the interior regions of the two flow paths) can share flow velocities, spatial derivatives, pressure values, directional gradients of pressure, or other variables for each node. The variables can be shared between disparate models, for example, the to ensure model compatibility or to provide other functionality.

In some implementations, a one-dimensional model incorporating connection conditions at the fluid junctions can provide a rigorous and stable approach for incorporating the flow loss to the formation, for example, for an arbitrarily-drilled well and fracture junctions. Some one-dimensional models can be coupled with any reservoir model for processes such as hydraulic fracturing, advanced acids, digital temperature sensing, etc. It can be based on flow physics derived from the momentum conservation equations or conservation equations for other properties such as temperature, proppant, species, etc. Hence, it can be valid over a wide range of complex fluid flow systems involving bifurcations, junctions, fluid loss points, and small domains.

FIG. 5 is a flow chart showing an example process 500 for simulating fluid flow. All or part of the example process 500 may be computer-implemented, for example, using the features and attributes of the example computing system 200 shown in FIG. 2 or other computing systems. The process 500, individual operations of the process 500, or groups of operations may be iterated or performed in a distributed mode, parallel mode, in serial mode, or in any combination of the above, or in another manner. In some cases, the process 500 may include the same, additional, fewer, or different operations performed in the same or a different order.

The example process 500 can be used to simulate unsteady or steady, compressible or incompressible flow in a variety of physical systems. In some implementations, the process 500 is used to simulate flow in a fluid injection or production system (e.g., in a wellbore, in a flow control device or flow conduit installed in a wellbore, etc.), within a subterranean formation (e.g., from a wellbore into reservoir or formation media, through a rock matrix in the reservoir media, through fractures or discontinuities in the reservoir media, etc.), or combinations thereof. The process 500 may also be used to simulate flow in other environments, for example, outside the context of a well system.

The example process 500 can be used to simulate the flow of various fluids. In some cases, the process 500 is used to simulate one or more well system fluids. Here, the term "well system fluid" is used broadly to encompass a wide variety of fluids that may be found in or near, or may be used in connection with, a well system. Well system fluids can include one or more native fluids that reside in a subterranean region (e.g., brine, oil, natural gas, etc.), one or more fluids that have been or will be injected into a subterranean region (e.g., fracturing fluids, treatment fluids, etc.), one or more fluids that have been or will be communicated within a wellbore or within one or more tools installed in the well bore (e.g., drilling fluids, hydraulic fluids, etc.), and other types of fluids.

The example process 500 can simulate fluid flow based on a one-dimensional flow model. The flow model can include nodes of multiple discretized one-dimensional flow paths. In some instances, the flow paths intersect, for example, at an intermediate point on one or both of the flow paths. For example, the process 500 can use the example flow model 400 shown in FIG. 4, or another type of flow model. The flow model can also include governing equations and associated variables for each of the nodes. For example, the flow model can include one or more of the example Equations (1), (3) and (5) shown above. The flow model can include other types of variables or equations.

In some implementations, the one-dimensional flow model is configured to model the flow of well system fluid in a fracture in a subterranean region, where the nodes of the flow model represent a sequence of locations at which fluid can flow through the fracture. The nodes can include end point nodes, staggered nodes, intermediate nodes, or other types of nodes. In some cases, the flow model includes end point nodes at either end of each flow path, and multiple intermediate nodes between the end point nodes. In some cases, one or more of the end point nodes or intermediate nodes is an intersection node that is shared by another flow path.

At 502, intersections and intersecting flow paths are identified. In some cases, the intersecting flow paths are identified by identifying one or more intersections or junctions at which multiple flow paths intersect. Intersections and intersecting flow paths can be identified in another manner, for example, based on flow model data or other information.

At 504, the governing equations are discretized. The governing flow equations can be provided by the flow model or another source. The governing equations can be discretized, for example, according to a finite difference technique or another discretization method. The discretization for each node or staggered point incorporates fluid communication with an adjacent node or staggered point in each flow direction. The discretization can incorporate fluid communication across more than one adjacent node or staggered point in each flow direction. For example, the discretization at each node can incorporate fluid communication across two or three adjacent nodes in each direction of flow.

At 506, connection conditions are generated for each intersection. The connection conditions can include equations or parameters that describe the flow between flow path branches at the intersection. In some implementations, the connection conditions are determined from the physical properties of the fluid system (e.g. geometry, boundary conditions, known fluid parameters, etc.). In some examples, the connection conditions can include mass flux conservation (508a) and momentum conservation (508b) equations in the junction domain of the intersection. In some implementations, the connection conditions can include one or more of the conservation Equations (3), (5), and (6). The connection conditions can include information about the cross-sections (508c) of each intersecting flow path.

At 520, a solution is obtained. The solution can be obtained based on the discretized governing flow equations and the connection conditions. In some implementations, the discretized governing flow equations and the connection conditions are combined and solved numerically. For example, a direct solver can be used to solve the discretized governing flow equations and the connection conditions simultaneously. In some cases, an iterative method such as Newton's algorithm can be used to solve the equations and obtain the solution. The solution can indicate one or more flow velocities, pressures, or values for other variables at each discretized location on the intersecting flow paths.

FIGS. 6-9 show example computed results using a one-dimensional model and using a two-dimensional model. The two-dimensional model solves the full Navier-Stokes equations in two spatial dimensions. The two-dimensional model was simulated using COMSOL Multiphysics version 4.3b, which is a commercially-available computational fluid dynamics (CFD) software module available from Comsol, Ansys Inc. The one-dimensional model uses a process based on connection conditions, such as the connection conditions described with respect to FIGS. 3, 4, and 5. The fluid system simulated has three flow path branches like the example shown in FIG. 4. In the examples shown in FIGS. 6-9, the one-dimensional model's results are within 10% of the two-dimensional model's results since the friction is not correctly represented with an accurate friction factor.

These data shown in FIGS. 6-9 provide an example of the accuracy of calculations in an example one-dimensional model compared against a two-dimensional model. FIGS. 6-9 show that the one-dimensional model with connection conditions can represent both diverging and merging junction flows. Similarly accurate results are obtained for junctions with different branch cross-sectional areas.

FIG. 6 shows a comparison of fluid velocity. The x-axis represents locations along a flow path, and the y-axis represents the fluid flow velocity at each location. Curve 610 is the calculation of the fluid flow velocity from the one-dimensional model, and curve 620 is the calculation of the fluid flow velocity from the two-dimensional model. For these simulations, an inlet flow path branch splits into two flow path branches. The inlet velocity is (0.1× time), and the results are calculated after 1 second of time. For this example, the cross-sectional area of each fluid flow branch is the same. A comparison between the two-dimensional model and the one-dimensional model shows agreement within 10%.

Figure 7:
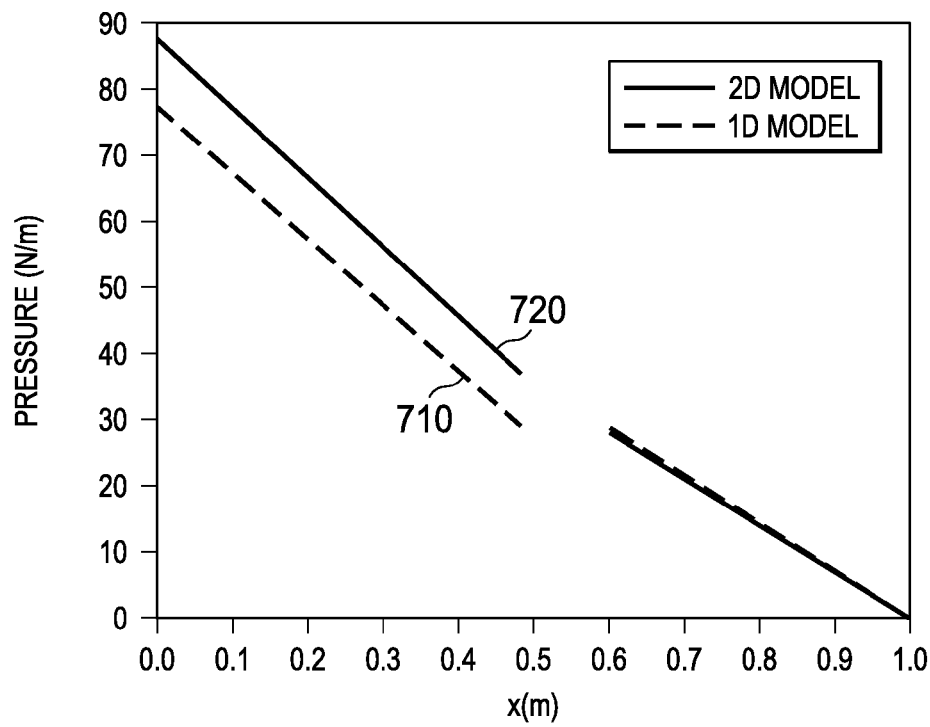
FIG. 7 is a plot showing pressure data from example numerical simulations.

FIG. 7 shows a comparison of results for fluid pressure calculations from the two-dimensional and one-dimensional models. The system setup is the same as that of FIG. 6. The x-axis represents locations along a flow path, and the y-axis represents the fluid pressure at each location. Curve 710 is the calculation of fluid pressure from the one-dimensional model, and curve 720 is the calculation of fluid pressure from the two-dimensional model. A comparison between the two-dimensional model and the one-dimensional model shows agreement within 10%.

Figure 8:
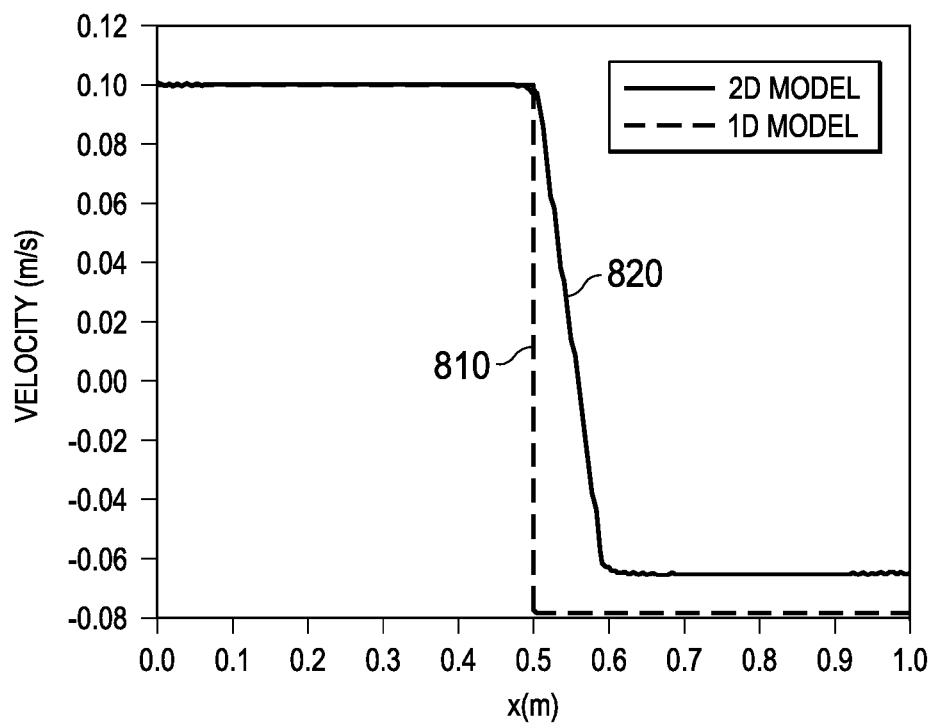
FIG. 8 is a plot showing velocity data from example numerical simulations.
Figure 9:
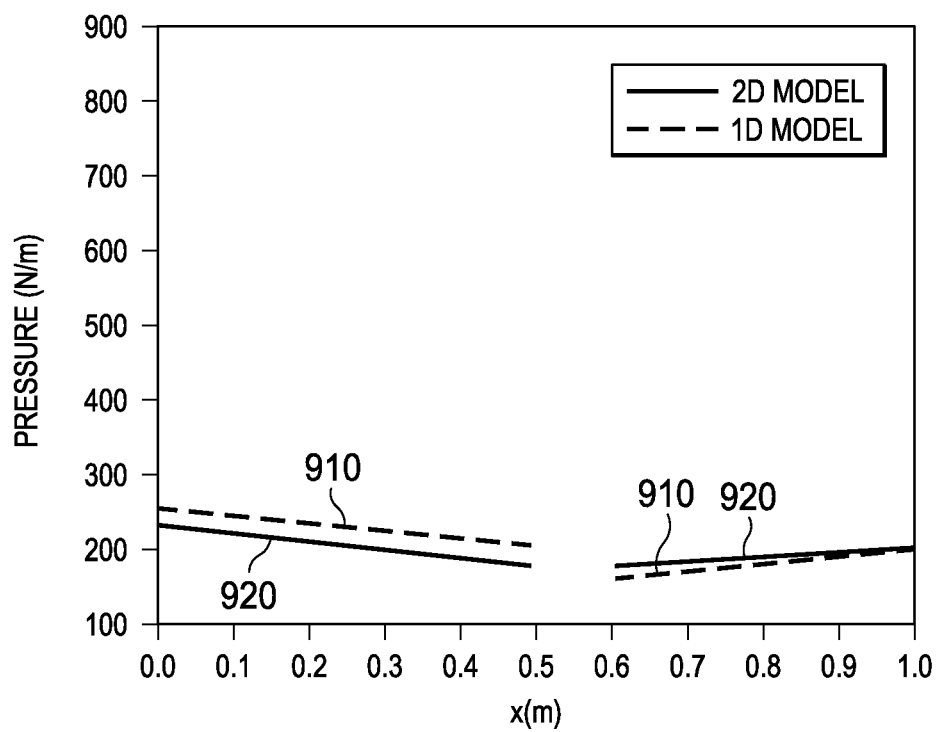
FIG. 9 is a plot showing pressure data from example numerical simulations.

FIGS. 8-9 show a similar comparison of one-dimensional and two-dimensional simulations, but the example fluid system modeled includes two fluid flow branches merging into one stream. The inlet velocity is (0.1× time), and the results are calculated after 1 second of time. For this example, the cross-sectional area of each fluid flow branch is the same. In FIG. 8, the fluid velocity for the system is calculated. The x-axis represents locations along a flow path, and the y-axis represents the fluid flow velocity at each location. In FIG. 8, curve 810 is the fluid flow velocity calculated from the one-dimensional model with connection conditions, and curve 820 is the fluid flow velocity calculated from the two-dimensional model.

In FIG. 9, the fluid pressure is calculated. In FIG. 9, curve 910 is the one-dimensional model results and curve 920 is the two-dimensional model results. The x-axis represents locations along a flow path, and the y-axis represents the fluid pressure at each location. For both FIGS. 8 and 9, a comparison between the two-dimensional model and the one-dimensional model shows agreement within 10%.

In some implementations of what is described here, a one-dimensional fluid flow model describes the relationship between the flow characteristics in all of the intersected flow path branches at the vicinity of a junction. The one-dimensional model can simulate fluid flow based on the connection conditions at the fluid junction domain and use a finite difference approximation method related to the physics of the fluid flow. The one-dimensional fluid flow models described here are applicable to many physics and engineering fluid systems, such as for a wellbore/perforation junction or for fluid junctions embedded in a fracture network.

Some embodiments of subject matter and operations described in this specification can be implemented in digital electronic circuitry, or in computer software, firmware, or hardware, including the structures disclosed in this specification and their structural equivalents, or in combinations of one or more of them. Some embodiments of subject matter described in this specification can be implemented as one or more computer programs, i.e., one or more modules of computer program instructions, encoded on computer storage medium for execution by, or to control the operation of, data processing apparatus. A computer storage medium can be, or can be included in, a computer-readable storage device, a computer-readable storage substrate, a random or serial access memory array or device, or a combination of one or more of them. Moreover, while a computer storage medium is not a propagated signal, a computer storage medium can be a source or destination of computer program instructions encoded in an artificially generated propagated signal. The computer storage medium can also be, or be included in, one or more separate physical components or media (e.g., multiple CDs, disks, or other storage devices).

The term "data processing apparatus" encompasses all kinds of apparatus, devices, and machines for processing data, including by way of example a programmable processor, a computer, a system on a chip, or multiple ones, or combinations, of the foregoing. The apparatus can include special purpose logic circuitry, e.g., an FPGA (field programmable gate array) or an ASIC (application specific integrated circuit). The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures.

A computer program (also known as a program, software, software application, script, or code) can be written in any form of programming language, including compiled or interpreted languages, declarative or procedural languages. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

Some of the processes and logic flows described in this specification can be performed by one or more programmable processors executing one or more computer programs to perform actions by operating on input data and generating output. The processes and logic flows can also be performed by, and apparatus can also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and processors of any kind of digital computer. Generally, a processor will receive instructions and data from a read only memory or a random access memory or both. A computer includes a processor for performing actions in accordance with instructions and one or more memory devices for storing instructions and data. A computer may also include, or be operatively coupled to receive data from or transfer data to, or both, one or more mass storage devices for storing data, e.g., magnetic, magneto optical disks, or optical disks. However, a computer need not have such devices. Devices suitable for storing computer program instructions and data include all forms of non-volatile memory, media and memory devices, including by way of example semiconductor memory devices (e.g., EPROM, EEPROM, flash memory devices, and others), magnetic disks (e.g., internal hard disks, removable disks, and others), magneto optical disks, and CD ROM and DVD-ROM disks. The processor and the memory can be supplemented by, or incorporated in, special purpose logic circuitry.

To provide for interaction with a user, operations can be implemented on a computer having a display device (e.g., a monitor, or another type of display device) for displaying information to the user and a keyboard and a pointing device (e.g., a mouse, a trackball, a tablet, a touch sensitive screen, or another type of pointing device) by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

A computer system can be or include a single computing device, or multiple computers that operate in proximity or generally remote from each other and typically interact through a communication network. Examples of communication networks include a local area network ("LAN") and a wide area network ("WAN"), an inter-network (e.g., the Internet), a network comprising a satellite link, and peer-to-peer networks (e.g., ad hoc peer-to-peer networks). A relationship of client and server may arise by virtue of computer programs running on the respective computers and having a client-server relationship to each other.

In some aspects, a fluid flow modeling method includes generating a flow path connection condition for a flow path intersection in a one-dimensional flow model. The one-dimensional flow model can model fluid flow in a subterranean region (e.g., in a fracture, in a wellbore, in porous rock media, etc.). The flow path connection condition can conserve fluid momentum, mass flux, or other physical quantities among three or more flow path branches that meet at the flow path intersection. Fluid flow in the subterranean region can be simulated by operating the one-dimensional flow model based on the connection condition.

Implementations of these and other aspects can include one or more of the following features. Some or all of the connection conditions can account for flow cross-sections of each respective flow path branch at the flow path intersection. Some or all of the connection conditions can account for steady-state flow, unsteady-state flow, or both, in each respective flow path branch. Some or all of the connection conditions can conserve mass flux based on the flow cross-sections of the branches at the flow path intersection and a fluid velocity in the respective flow cross-section. Some or all of the connection conditions can conserve conserves fluid momentum based on flow cross-sections of the branches at the flow path intersection, a fluid velocity in each respective flow cross-section, and a fluid pressure in each respective flow cross-section.

Additionally or alternatively, implementations of these and other aspects can include one or more of the following features. Simulating fluid flow can include solving for values of multiple fluid flow variables at multiple locations along one or more of the flow path branches. The fluid flow variables can include fluid velocity, fluid pressure, or other variables. In some cases, the fluid flow model is coupled to another flow model. For example, the one-dimensional fluid flow model can be or include an intersection flow model that is coupled to other types of models that represent flow within an interior of each respective flow path branch. The flow models can include compatibility conditions that share flow variables among the flow models and allow the flow models to consistently interface with each other. The one-dimensional flow model can include a finite difference model, a finite element model, or another type of model.

While this specification contains many details, these should not be construed as limitations on the scope of what may be claimed, but rather as descriptions of features specific to particular examples. Certain features that are described in this specification in the context of separate implementations can also be combined. Conversely, various features that are described in the context of a single implementation can also be implemented in multiple embodiments separately or in any suitable subcombination.

A number of examples have been described. Nevertheless, it will be understood that various modifications can be made. Accordingly, other implementations are within the scope of the following claims.

The invention claimed is:

1. A fluid flow modeling method comprising:
generating, by operation of data processing apparatus, a flow path connection condition for a flow path intersection in a one-dimensional flow model, the one-dimensional flow model representing fluid flow in a subterranean region, the flow path connection condition conserving fluid momentum among three or more flow path branches that meet at the flow path intersection according to:

$$A_i(P_i+\rho U_i^2)=A_j(P_j+\rho U_j^2)$$

where $\rho$ represents a density of the well system fluid, $A_i$ and $A_j$ represent respective flow cross-sections of branches i and j, $P_i$ and $P_j$ represent respective fluid pressures in branches i and j, and $U_i$ and $U_j$ represent respective fluid velocities in branches i and j; and simulating fluid flow in the subterranean region by operating the one-dimensional flow model based on the connection condition;

wherein an injection treatment control system selects or modifies fluid pressures, fluid densities, fluid compositions, and other control parameters based on data provided by the simulated fluid flow.

2. The method of claim 1, wherein the connection condition accounts for flow cross-sections of each respective flow path branch at the flow path intersection.

3. The method of claim 1, wherein the connection condition accounts for steady-state flow in each respective flow path branch.

4. The method of claim 1, comprising generating multiple connection conditions for the flow path intersection, wherein a first connection condition conserves fluid momentum among the three or more flow path branches, and a second connection condition conserves mass flux among the three or more flow path branches.

5. The method of claim 4, wherein the second connection condition conserves mass flux based on the flow cross-sections of the branches at the flow path intersection and a fluid velocity in the respective flow cross-section.

6. The method of claim 1, wherein the connection condition conserves fluid momentum based on flow cross-sections of the branches at the flow path intersection, a fluid velocity in each respective flow cross-section, and a fluid pressure in each respective flow cross-section.

7. The method of claim 1, wherein simulating fluid flow includes solving for values of a fluid flow variable for multiple locations along one or more of the branches.

8. The method of claim 7, wherein the fluid flow variable includes at least one of fluid velocity or fluid pressure.

9. The method of claim 1, wherein the one-dimensional flow model represents multiple flow paths that each intersect a common flow path at respective flow path intersections.

10. The method of claim 1, wherein the one-dimensional flow model represents a flow loop that intersects another flow path at multiple flow path intersections.

11. The method of claim 1, wherein the one-dimensional flow model includes a plurality of nodes for each of the flow path branches.

12. The method of claim 1, wherein the one-dimensional flow model includes a finite difference model or a finite element model.

13. The method of claim 1, wherein the one-dimensional flow model includes a plurality of governing flow equations, and the method comprises:
discretizing the governing flow equations; and
solving a system of equations that includes the discretized governing flow equations and the connection condition.

14. A non-transitory computer-readable medium storing instructions that, when executed by data processing apparatus, perform operations comprising:
generating a flow path connection condition for a flow path intersection in a one-dimensional flow model for well system fluid, the flow path connection condition conserving momentum of the well system fluid among three or more flow path branches that meet at the flow path intersection according to:

$$A_i(P_i+\rho U_i^2)=A_j(P_j+\rho U_j^2)$$

where ρ represents a density of the well system fluid, $A_i$ and $A_j$ represent respective flow cross-sections of branches i and j, $P_i$ and $P_j$ represent respective fluid pressures in branches i and j, and $U_i$ and $U_j$ represent respective fluid velocities in branches i and j; and simulating flow of the well system fluid by operating the one-dimensional flow model based on the connection condition;

wherein an injection treatment control system selects or modifies fluid pressures, fluid densities, fluid compositions, and other control parameters based on data provided by the simulated fluid flow.

15. The computer-readable medium of claim 14, wherein the connection condition accounts for flow cross-sections of each respective flow path branch at the flow path intersection.

16. The computer-readable medium of claim 14, wherein the connection condition conserves mass flux among the three or more flow path branches.

17. The computer-readable medium of claim 14, wherein simulating fluid flow includes solving for values of a fluid flow variable for multiple locations along one or more of the branches.

18. The computer-readable medium of claim 14, wherein the flow model includes a plurality of nodes for each of the branches.

19. The computer-readable medium of claim 18, wherein the nodes represent locations of fluid flow through a fracture network in a subterranean region.

20. The computer-readable medium of claim 18, wherein the nodes represent locations of fluid flow through a plurality of conduits installed in a wellbore.

21. The computer-readable medium of claim 14, wherein the one-dimensional flow model includes discretized governing flow equations, and simulating fluid flow includes solving a system of equations that includes the discretized governing flow equations and the connection condition.

22. A fluid flow modeling system comprising one or more computers that include:
  a processor; and
  a memory, wherein the memory stores instructions for the processor which include application modules that comprise:
    a connection condition module which generates a flow path connection condition for a flow path intersection in a one-dimensional flow model for well system fluid, the flow path connection condition conserving fluid momentum among three or more flow path branches that meet at the flow path intersection according to:
      $A_i(P_i+\rho U_i^2)=A_j(P_j+\rho U_j^2)$ where ρ represents a density of the well system fluid, $A_i$ and $A_j$ represent respective flow cross-sections of branches i and j, $P_i$ and $P_j$ represent respective fluid pressures in branches i and j, and $U_i$ and $U_j$ represent respective fluid velocities in branches i and j; and
    a solver module which solves for a value of a fluid flow variable for a location on one or more of the flow path branches based on the connection condition; wherein:
      the connection condition and solver modules are either hardware or software modules;
      the one-dimensional flow model simulates flow of the well system fluid based on the connection condition; and
      an injection treatment control system selects or modifies fluid pressures, fluid densities, fluid compositions, and other control parameters based on data provided by the simulated fluid flow.

23. The fluid flow modeling system of claim 22, wherein the location includes the flow path intersection.

24. The fluid flow modeling system of claim 22, wherein the connection condition conserves mass flux according to:

$$\sum_{k=1}^{N} A_k U_k = 0$$

where N represents the number of branches that meet at the flow path intersection, $A_k$ represents a flow cross-section of branch k at the flow path intersection, and $U_k$ represents a velocity of fluid flow in branch k at the flow path intersection.

25. The fluid flow modeling system of claim 22, wherein the one-dimensional flow model includes a plurality of discretized governing flow equations.

26. The fluid flow modeling system of claim 25, wherein the solver module is operable to solve a system of equations that includes the discretized governing flow equations and the connection condition.

* * * * *